United States Patent
Hartmann et al.

(10) Patent No.: US 11,999,109 B2
(45) Date of Patent: Jun. 4, 2024

(54) METHOD AND ASSEMBLY FOR SEPARATING EXCESS MATERIAL FROM AN ADDITIVELY MANUFACTURED COMPONENT

(71) Applicant: Siemens Aktiengesellschaft, Munich (DE)

(72) Inventors: Dirk Hartmann, Aßling (DE); Christoph Kiener, Bayern (DE); Meinhard Paffrath, Feldkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 100 days.

(21) Appl. No.: 17/620,869

(22) PCT Filed: May 15, 2020

(86) PCT No.: PCT/EP2020/063650
§ 371 (c)(1),
(2) Date: Dec. 20, 2021

(87) PCT Pub. No.: WO2020/259923
PCT Pub. Date: Dec. 30, 2020

(65) Prior Publication Data
US 2022/0347923 A1 Nov. 3, 2022

(30) Foreign Application Priority Data

Jun. 28, 2019 (EP) ..................... 19183259

(51) Int. Cl.
*B33Y 50/02* (2015.01)
*B22F 10/28* (2021.01)
(Continued)

(52) U.S. Cl.
CPC .............. *B29C 64/35* (2017.08); *B22F 10/28* (2021.01); *B22F 10/68* (2021.01); *B22F 10/80* (2021.01);
(Continued)

(58) Field of Classification Search
CPC .......... B22F 10/28; B22F 10/68; B22F 10/80; B22F 12/88; B22F 12/90; B22F 2003/247;
(Continued)

(56) References Cited

U.S. PATENT DOCUMENTS

2002/0090410 A1* 7/2002 Tochimoto ............ B29C 64/357
425/215
2004/0191349 A1* 9/2004 Shimada ................... A61J 3/10
425/418
(Continued)

FOREIGN PATENT DOCUMENTS

CN 108290219 A 7/2018
CN 108602123 A 9/2018
(Continued)

OTHER PUBLICATIONS

PCT International Search Report dated Jul. 13, 2020 corresponding to PCT International Application No. PCT/EP2020/063650 filed May 15, 2020.

*Primary Examiner* — Yuhui R Pan
(74) *Attorney, Agent, or Firm* — Schmelser, Olsen & Watts, LLP

(57) ABSTRACT

In order to separate excess material from an additively manufactured component, spatially resolved structural data on the component are received. On the basis of the structural data, a process for emptying material from the component is simulated, wherein a sequence of emptying poses of the component is determined. For an associated emptying pose:
(Continued)

the component is moved into the associated emptying pose in accordance with the simulated emptying process, movement of material is detected by sensors, as a result of a detection of a decrease in the movement of material, a trigger signal is generated, and a movement of the component into a subsequent emptying pose is initiated by the trigger signal, the trigger signal being considered higher priority than the simulated emptying process.

13 Claims, 3 Drawing Sheets

(51) Int. Cl.
- *B22F 10/68* (2021.01)
- *B22F 10/80* (2021.01)
- *B22F 12/90* (2021.01)
- *B29C 64/153* (2017.01)
- *B29C 64/35* (2017.01)
- *B29C 64/393* (2017.01)
- *B33Y 40/00* (2020.01)
- *B22F 12/88* (2021.01)

(52) U.S. Cl.
CPC ............ *B22F 12/90* (2021.01); *B29C 64/153* (2017.08); *B29C 64/393* (2017.08); *B33Y 40/00* (2014.12); *B33Y 50/02* (2014.12); *B22F 12/88* (2021.01)

(58) Field of Classification Search
CPC ..... B29C 64/153; B29C 64/35; B29C 64/386; B29C 64/393; Y02P 10/25; B33Y 40/00; B33Y 50/00; B33Y 50/02
See application file for complete search history.

(56) References Cited

U.S. PATENT DOCUMENTS

| | | |
|---|---|---|
| 2010/0161102 A1 | 6/2010 | Mattes et al. |
| 2010/0304010 A1* | 12/2010 | Powell ................... G01F 1/66 |
| | | 427/8 |
| 2018/0169758 A1 | 6/2018 | Ederer et al. |
| 2019/0015901 A1 | 1/2019 | Haberland et al. |
| 2019/0076925 A1* | 3/2019 | Lakshman ............. B33Y 50/02 |
| 2019/0077077 A1 | 3/2019 | Martin et al. |
| 2019/0134746 A1 | 5/2019 | Volk |
| 2019/0160754 A1 | 5/2019 | Ott |
| 2019/0193148 A1* | 6/2019 | Kiener ................. B29C 64/153 |
| 2023/0042539 A1 | 2/2023 | Jones et al. |

FOREIGN PATENT DOCUMENTS

| | | | |
|---|---|---|---|
| CN | 101890219 A | 10/2018 | |
| CN | 109153077 A | 1/2019 | |
| DE | 102008060046 A1 | 6/2010 | |
| DE | 102010015451 A1 | 10/2011 | |
| DE | 102016216839 A1 * | 3/2018 | .............. B08B 5/04 |
| DE | 102016216839 A1 | 3/2018 | |
| DE | 102018106706 A1 | 10/2018 | |
| DE | 102017208651 A1 | 11/2018 | |
| EP | 3456438 A1 | 3/2019 | |
| WO | WO 2018046373 A1 | 3/2018 | |

* cited by examiner

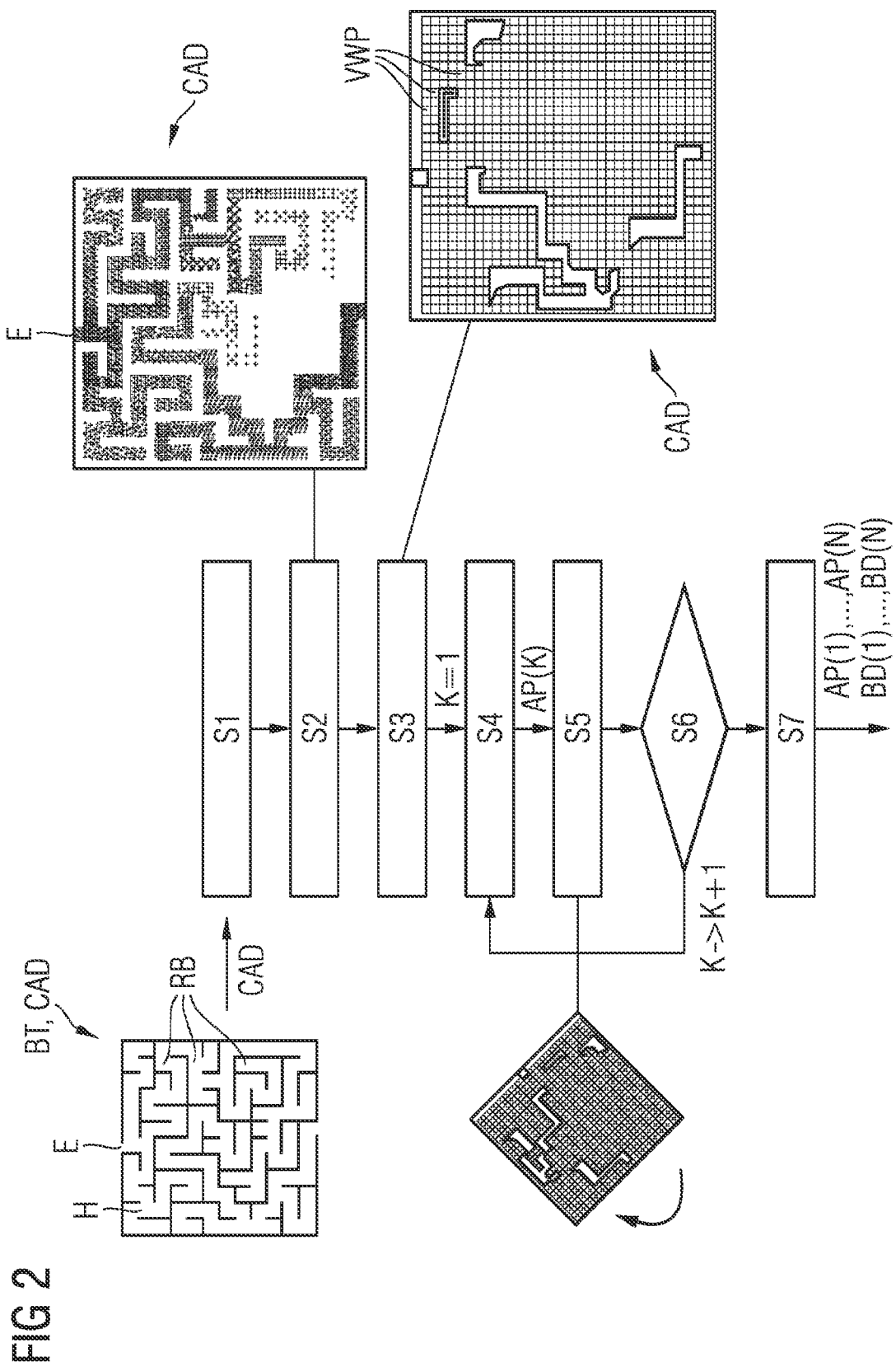

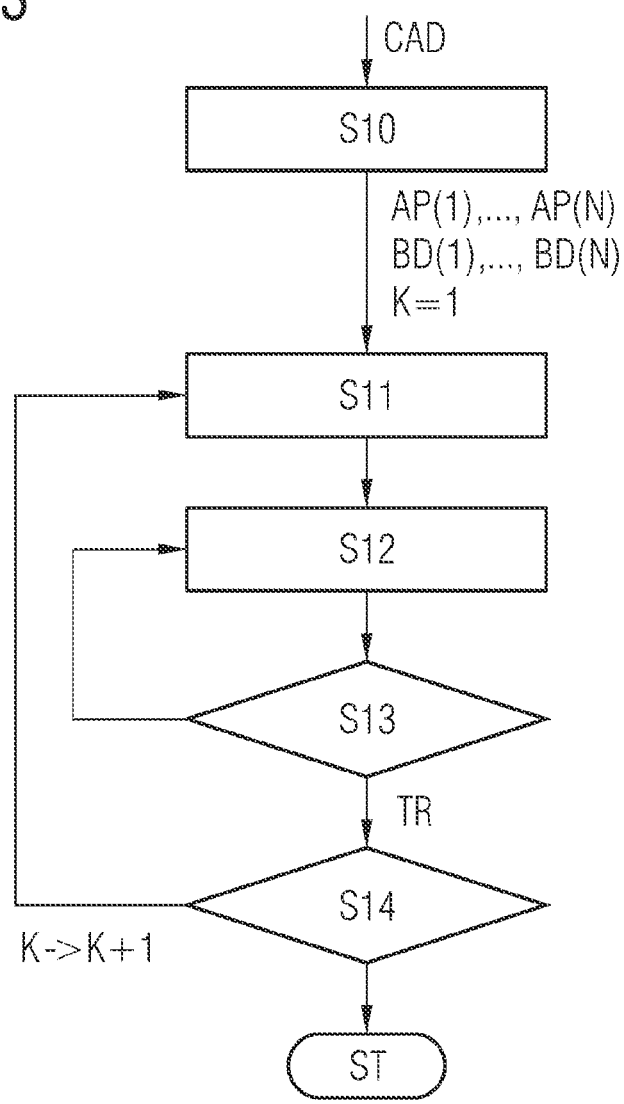

METHOD AND ASSEMBLY FOR SEPARATING EXCESS MATERIAL FROM AN ADDITIVELY MANUFACTURED COMPONENT

CROSS-REFERENCE TO RELATED APPLICATIONS

This application claims priority to PCT Application No. PCT/EP2020/063650, having a filing date of May 15, 2020, which claims priority to EP Application No. 19183259.1, having a filing date of Jun. 28, 2019, the entire contents both of which are hereby incorporated by reference.

FIELD OF TECHNOLOGY

The following relates to a method and assembly for separating excess material from an additively manufactured component.

BACKGROUND

Additive manufacturing is becoming increasingly important in modern production processes. It allows the production of products with virtually any complex shape and topology with relatively low expenditure and complexity. Additive manufacturing requires the observance of only a few structural constraints in comparison with conventional manufacturing methods.

The so-called powder bed method, which finds use in particular when producing metallic components, is a known type of additive manufacturing technology. In this case, the material for the component to be produced is provided in layers in the form of a powder bed, fluid bed or material bed. To produce the component, the individual particles of the material are then interconnected layer by layer. In this case, the material can be a metal, a polymer powder, an inorganic material or any other powdery or liquid material. The material particles can be connected by way of physical or chemical processes, by sintering, adhesive bonding, fusing, solidifying or other connecting methods. Known methods are laser melting and laser sintering, and the application of UV radiation to cure liquid materials.

The non-connected, that is to excess material serves as a passive support structure during the manufacturing process such that overhang geometries, for example, can be realized. A similar statement also applies to fluid or fluidizable materials, such as for example monomers that are curable by UV radiation. After the manufacturing process has been completed, the non-connected material frequently completely fills or at least partly fills the component and must be removed from the cavities of the finished component after the component has been removed from the material bed.

Until now, the excess material has been removed manually or by way of machine-based rotating or shaking of the component. However, such a procedure can be very time-consuming—especially if the component has cavities with a complex geometry.

SUMMARY

An aspect relates to a method and an assembly which facilitate an efficient separation of excess material from an additively manufactured component.

For the purposes of separating excess material from an additively manufactured component, spatially resolved structural data relating to the component are received. On the basis of the structural data a process for emptying material from the component is simulated, wherein a sequence of emptying poses of the component is ascertained. According to embodiments of the invention, for a respective emptying pose
- the component is moved into the respective emptying pose on the basis of the simulated emptying process,
- a material movement is detected by one or more sensors,
- a trigger signal is generated as a consequence of a detection of a reduction in the material movement, and
- the trigger signal prompts a movement of the component into a subsequent emptying pose, wherein the trigger signal is considered higher priority than the simulated emptying process.

As a rule, the excess material can be separated very effectively from the component by simulating the emptying process and carrying out a movement of the component into advantageous emptying poses on the basis thereof. In particular, the higher priority trigger of a movement into a subsequent emptying pose can avoid the delays which are based on an overestimate of an emptying duration by the simulation. An emptying duration for the component can be significantly reduced in many cases by embodiments of the invention.

On the basis of the structural data a cavity of the component can be ascertained and divided into spatial regions according to an embodiment of the invention. For a respective spatial region a path length of a path running in the cavity to an opening of the cavity and a pouring direction, in which this path length shortens, can then be ascertained and assigned to the respective spatial region. The sequence of emptying poses can be derived from the ascertained pouring directions. The pouring direction specifies a direction for a respective spatial region in which the material situated there should be conveyed or poured in order to approach the opening. In an embodiment, the direction of a negative gradient of the spatially dependent path length can be ascertained locally as pouring direction. The negative gradient specifies the direction in which the path length shortens maximally.

For division into spatial regions, a virtual spatial grid can be placed over the component or the cavity. The spatial regions are then formed by the grid cells of this virtual grid that are situated in the cavity of the component or which overlap therewith.

In an embodiment, a shortest path length of a respective spatial region to the opening can be ascertained by a fast-marching method. A multiplicity of efficient standard routines are available to carry out fast-marching methods.

According to a further embodiment the cavity of the component can be simulatively filled with virtual material. Further, it is possible to select a spatial region that has a shorter path length to the opening and/or that is filled with more virtual material than other spatial regions. A pouring direction assigned to the selected spatial region can be ascertained therefrom, from which an emptying pose then is derived. In an embodiment, the emptying pose of the component can be chosen such that the ascertained pouring device points downward in the direction of gravity.

In particular, a movement-related distribution of virtual material in the component can be simulated within the scope of the simulation of the emptying process. This allows more accurate simulation of the emptying process in many cases.

Furthermore, the component can be rotated into different spatial orientations and/or made to mechanically vibrate by a movement device. An amplitude, frequency or vibration direction of the vibration can be optimized by simulation in embodiments. Mechanical vibrations of the component during the emptying process promote an equally distributed and hence frequently better simulatable state of the excess material in the component. Moreover, the material can be, as it were, shaken out of the component by the vibrations.

According to a further embodiment the material movement can be detected by a balance which weighs material poured out of the component. Then, the trigger signal can be generated as soon as a weight of the material poured out remains at least approximately stationary, that is to say no longer changes or has no more substantial changes.

Moreover, material falling from the component can be detected by an optical sensor, in particular a camera or a photoelectric barrier. The trigger signal can be generated as soon as a detection result drops below a specified threshold.

To detect the material falling from the component, the material can be illuminated by a laser. In particular, a fast rotating or otherwise moving laser beam can be used to illuminate the falling material in a plane. A plurality of rotating laser beams can be used in different planes for illumination purposes and can be used with different colors.

Further, noises of material falling from the component can be detected by an acoustic sensor. The trigger signal can be generated as soon as a detection result drops below a specified threshold.

Moreover, movements of the material within the component can be detected by a motion sensor. The trigger signal can be generated as soon as a detection event drops below a specified threshold. By way of example, such a motion sensor can comprise a laser interferometer or a micro system, in particular a so-called MEMS (micro-electromechanical system) for detecting small movements of the component or of the material situated therein. In particular, the detection can be implemented by way of a frequency detection.

According to a further embodiment of the invention, a specified time interval can be awaited following the detection of the reduction in the material movement before the component is moved to the subsequent emptying pose. In many cases, this can ensure that even possible residual movements of the material, in particular in the interior of the component, have stopped. The time interval can be specified in absolute terms or relative to a pose-specific time period or a time period that has already elapsed.

BRIEF DESCRIPTION

Some of the embodiments will be described in detail, with reference to the following figures, wherein like designations denote like members, wherein:

FIG. 2 shows a simulation of an emptying process according to embodiments of the invention; and FIG. 3 shows a flowchart of a method according to embodiments of the invention.

DETAILED DESCRIPTION

Figure 1:
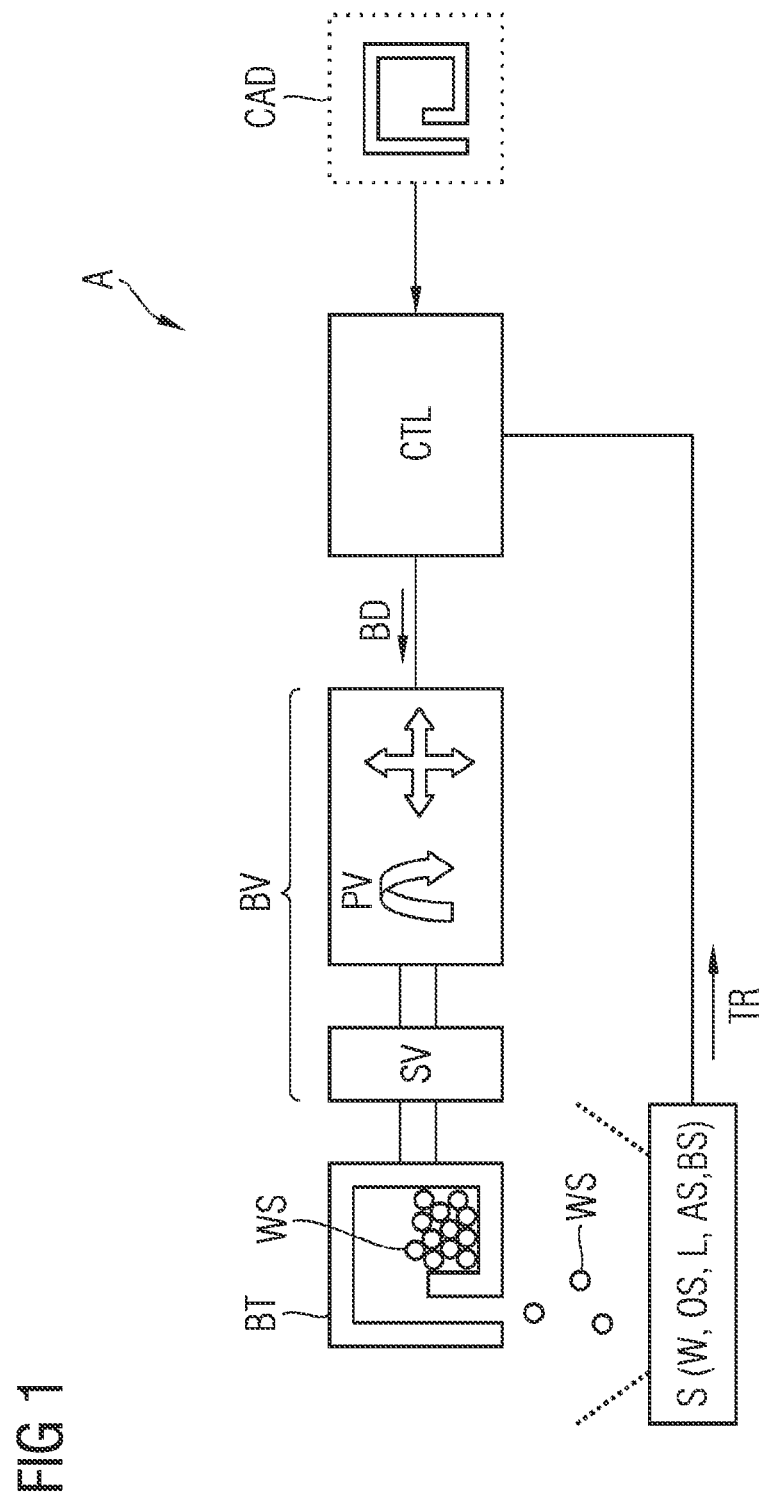
FIG. 1 shows an assembly according to embodiments of the invention.

In a schematic illustration, FIG. 1 shows an assembly A according to embodiments of the invention for separating excess material WS from an additively produced component BT, that is to say a component produced by an additive manufacturing method. In embodiments, the component BT is produced by a 3-D printer using the powder bed method, within the scope of which individual particles of a powdery or fluid material are interconnected layer-by-layer, as illustrated at the outset. The material WS not connected during the additive manufacture, and hence excess material, should be removed accordingly. FIG. 1 shows the component BT after completing the layer-by-layer manufacturing process, but still before the excess, non-connected material WS has been removed.

The assembly A comprises a vibration device SV, a positioning device PV, a controller CTL and a sensor system S.

The component BT is mechanically coupled to the vibration device SV which in turn is mechanically coupled to the positioning device PV. The positioning device PV, which is in the form of a robotic arm in embodiments, serves to put the component into different poses. A pose denotes a relative spatial position of the component and comprises its absolute position and spatial orientation or alignment. Thus, the component can be moved into different positions and spatial orientations by way of the positioning device PV.

The vibration device SV serves to make the component BT vibrate mechanically. An amplitude, frequency and/or vibration direction of the mechanical vibrations is variable in embodiments.

The positioning device PV can rotate the component BT together with the vibration device SV about one or more axes of rotation and can displace the component and the vibration device in translational fashion. In an embodiment, the component BT can be taken from a 3-D manufacturing environment, for example a 3-D printer, by a positioning device PV in the form of a robotic arm and can be fastened to the vibration device SV. The positioning device PV and the vibration device SV are part of a movement device BV for moving the component BT.

The sensor system S, the positioning device PV, the vibration device SV or the movement device BV are coupled to the controller CTL. The controller CTL serves to control the movement device BV, that is to say to control the positioning and orientation of the component BT by way of the positioning device PV and to control the vibrations to be caused by the vibration device SV.

According to embodiments of the invention, the movement device BV is controlled such that the component BT successively adopts various poses, within which the excess material WS is emptied as quickly and/or as completely as possible. Such advantageous emptying poses are ascertained on the basis of a simulation of one or more emptying processes. This simulation is carried out on the basis of a volumetric model CAD of the component BT by way of the controller CTL. In this case, the volumetric model CAD is represented by spatially resolved structural data of the component BT, which are transmitted to the controller CTL. On the basis of this simulation, the controller CTL ascertains suitable movement data BD for driving the positioning device PV and the vibration device SV, or the movement device BV. The movement data BD quantifies emptying poses to be adopted by the component BT and frequency, amplitude and/or vibration directions of vibrations. In embodiments, a respective emptying pose of the component BT can be specified by a position specification that quantifies a position of the component BT together with an angle specification that quantifies a spatial alignment or orientation of the component BT. In particular, solid angles or Euler angles can be used as angle specifications.

The movement device BV receives the movement data BD from the controller CTL and is controlled by the movement data BD. In this way, the positioning device PV is prompted to move the component BT into an emptying pose in which the excess material WS is emptied as quickly and as effectively as possible. Moreover, the vibration device SV is prompted to make the component BT vibrate mechanically such that the emptying process is accelerated where possible. In this case, the material WS is shaken out of the component BT in a certain sense.

Material WS emptied or falling from the component BT during the emptying process is detected by the sensor system S. In particular, the sensor system S serves to detect a movement of the material WS caused by the emptying process and, in particular, a reduction in this movement. For this purpose, the sensor system S can comprise different sensors. Thus, in particular, provision can be made for a balance W, by which the material WS emptied from the component BT is weighed on a continuous basis. In place of or in addition to the balance W, provision can also be made for another quantity sensor for detecting the emptied material WS. Furthermore, an optical sensor OS, for example a camera or a photoelectric barrier, can be used to detect the emptied material WS, for example, in conjunction with a laser L for illuminating the emptied material WS. Further, it is possible by way of an acoustic sensor AS to detect noises of the material WS falling from the component BT or of the material WS moving within the component BT. Moreover, movements of the material WS within the component BT can be detected by a motion sensor BS, for example by a laser interferometer or a so-called MEMS (micro-electro-mechanical system).

As soon as it is determined by the sensor system S that there is no longer any noticeable material movement, the assumption can be made, as a rule, that the movements of the material WS in the interior of the component BT have also died down. As soon as this state occurs, the emptying of the component and also possible emptying processes in the interior of the component BT stop for the current pose. Inasmuch as many simulations overestimate the duration of emptying processes, in embodiments it is advantageous to bring the component into the next emptying pose directly after the detection of the reduction in the material movement, without awaiting a time duration ascertained by the simulation.

Accordingly, the sensor system S generates a trigger signal TR and transmits the latter to the controller CTL as a consequence of the detection of the reduction in the material movement. In particular, the trigger signal TR can be generated as soon as a weight of the emptied material WS, as measured by the balance W, remains at least approximately stationary, that is to say no longer changes or has no more substantial changes. In the case of the other sensors OS, AS and BS, the trigger signal TR can be generated as soon as a detection event drops below a specified threshold.

As a consequence of receiving the trigger signal TR, the movement device BV is prompted by the controller CTL to move the component BT into the next emptying pose.

FIG. 2 elucidates a simulation of an emptying process of excess material WS from the component BT. To the extent the same or corresponding reference signs as in FIG. 1 are used in FIG. 2, these denote the same or corresponding entities, which are, for example, implemented or realized as described above.

To simulate the emptying process, in embodiments method steps S1 to S7 are carried out by the controller CTL.

A volumetric model CAD of the component BT in the form of spatially resolved structural data of the component BT is read by the controller CTL in method step S1. In particular, the volumetric model CAD can be available as a so-called CAD (CAD: computer aided design) model. The volumetric model CAD is used to ascertain a cavity H of the component BT which is filled with excess material WS following the additive manufacture of the component BT and which should be emptied by way of an opening E in the component BT.

To simulate the emptying process, the cavity H is divided into a multiplicity of spatial regions RB. For this purpose, a virtual spatial grid can be placed over the component BT or over the cavity H in embodiments. The spatial regions RB are then represented by the grid cells situated in the cavity H or overlapping with the latter. For reasons of clarity, FIG. 2 only explicitly represents a few of these spatial regions RB.

In method step S2, the volumetric model CAD is used to ascertain in each case, for a respective spatial region RB, a path length of a path running through the cavity H to the opening E. The respective path lengths are illustrated in shades in the top right part of FIG. 2, with darker regions being arranged closer to the opening E than bright regions. In embodiments, the path lengths can be ascertained with the aid of a so-called fast-marching method, by which a shortest path from this spatial region to the opening E is ascertained for each spatial region RB. According to the fast-marching method, it is possible to ascertain the shortest path and the path lengths thereof by virtue of considering virtual wave propagation emanating from the opening E and ascertaining an arrival time for each of the spatial regions RB. The arrival times then correspond to the path lengths to be ascertained.

Furthermore, a respective local pouring direction, in which the local path length shortens most, is ascertained for a respective region RB. In embodiments, this pouring direction is ascertained as a negative gradient of a path length field. The respectively ascertained path length and pouring direction is assigned to the respective spatial region.

In method step S3, the cavity H is, in simulation, completely or partly filled with virtual material particles VWP on the basis of the volumetric model CAD. In this case, a virtual material particle VWP in a simulation can represent a multiplicity of real material particles. If other simulations are used, filling with virtual material can be realized differently in an appropriate manner.

Furthermore, a counter K for the emptying poses to be ascertained is initialized as K=1.

In method step S4, an emptying pose AP(K) advantageous for a current fill state of the component BT with virtual material particles VWP and a suitable vibration of the component BT are ascertained. The choice of the current emptying pose AP(K) is determined by the emptying process, where gravity is a driving force and assisted by shaking the component BT. The choice of the emptying pose AP(K) is based on an analysis of the current fill level of the component BT, and the ascertained path lengths and pouring directions.

To ascertain an advantageous emptying pose AP(K), the spatial regions RB are searched for a spatial region which is currently filled with many virtual material particles VWP, in particular as many virtual material particles VWP as possible, and to which is assigned a short path length, in particular the shortest possible path length, to the opening E. Optionally, a pouring parameter can be ascertained for a respective spatial region RB by virtue of a current amount of virtual material particles VWP contained therein being combined by calculation with the assigned path length, for example in the form of a weighted sum. In an embodiment, such a pouring parameter can be increased by a short path length and by a greater number of currently contained virtual material particles VWP, and can otherwise be reduced. In this case, a spatial region with the highest pouring parameter can be selected from the spatial regions RB.

Subsequently, a pouring direction assigned to the found or selected spatial region is ascertained. An emptying pose AP(K), by which the component BT would be aligned such that the ascertained pouring direction points downward in the direction of gravity, is calculated on the basis of the ascertained pouring direction.

Furthermore, movement data that quantify the ascertained emptying pose AP(K) are determined. Moreover, further movement data are ascertained, by which the component BT would be made to vibrate in a way that accelerates the emptying process. The further movement data can specify amplitude, frequency and vibration direction of these vibrations in particular. The ascertained movement data are combined in a data record BD(K), which quantify a specific movement step for the component BT.

In method step S5, the emptying process of virtual material particles VWP from the opening E of the component BT specifically induced by this movement step is physically simulated. A simulation model to be used to this end can be implemented or initialized on the basis of the volumetric model CAD.

Within the scope of the simulation, the component BT is virtually brought into the emptying pose AP(K) and made to vibrate on the basis of the movement data BD(K) ascertained in method step S4. In particular, a distribution of the virtual material particles VWP in the component BT caused by movement is simulated in the process. As already mentioned above, the emptying process is driven by gravity and assisted by the vibrations. As a result of the vibrations, the material powder can be effectively "fluidized" in many cases or a viscosity of a material fluid can be reduced, as a result of which the treatment by simulation can frequently be simplified significantly. In an embodiment, the movement of virtual material particles VWP is calculated by a particle simulation. Such particle simulation methods can be calculated efficiently, especially on graphics processing units.

As a result of the simulation of the specific movement step, that is to say the specific emptying process in the emptying pose AP(K), a time progression of a distribution of the virtual material particles VWP in the component BT, resulting therefrom, is ascertained. In particular, a resultant time progression of a fill level of the component BT with virtual material particles VWP is ascertained. The current emptying pose AP(K), the resultant progression of the distribution of the virtual material particles VWP, and the resultant fill level progression are assigned to the respective movement step.

In method step S6, a check is carried out as to whether the cavity H has been emptied virtually. To this end, a target value for the emptying may be specified, for example a residual fill level, with the component BT being considered empty or ready for use if the residual fill level was undershot. Provided the cavity H has not been emptied, the counter K is incremented and there is a return to method step S4 in which the next emptying pose AP(K+1) is ascertained. Otherwise, method step S7 is carried out.

In method step S7, the simulation results are documented, and a control file based thereon is generated. The control file contains a sequence of the ascertained emptying poses AP(1), . . . , AP(N), associated movement data BD(1), . . . , BD(N) for driving the movement device BV, and further simulation results. In the present exemplary embodiment, the control file contains, for a K-th simulated movement step, the associated emptying pose AP(K), the movement data BD(K) specifying the movement step and the progression of the distribution of the virtual material particles VWP in the component BT resulting from the movement step.

FIG. 3 shows a flowchart of a method according to embodiments of the invention for separating excess material WS from the component BT. To the extent the same or corresponding reference signs as in the preceding figures are used in FIG. 3, these denote the same or corresponding entities, which are, for example, implemented or realized as described above.

The method according to embodiments of the invention is carried out by the controller CTL in embodiments, which in particular may comprise one or more processors, computers, application-specific integrated circuits (ASICs), digital signal processors (DSPs) and/or what are known as "field programmable gate arrays" (FPGAs) for the implementation.

In an initial method step S10, an emptying process as described in conjunction with FIG. 2 is simulated by method steps S1 to S7 on the basis of the volumetric model CAD. As described above, a control file is generated as a result of the simulation and the control file contains the sequence of the ascertained emptying poses AP(1), . . . , AP(N), the associated movement data BD(1), . . . , BD(N) for driving the movement device BV and, for a respective emptying pose AP(K), the time progression of the distribution of the virtual material particles VWP in the component BT resulting therefrom. In embodiments, the simulation can be carried out in advance or off-line.

The counter K for the emptying poses is initialized as K=1 before the next method step S11 is carried out.

In method step S11, the movement device BV is prompted on the basis of the movement data BD(K) to move the component BT into the emptying pose AP(K) and make the latter vibrate. The movement of the component BT or its time progression is oriented in this case on the time progression of the simulated material distribution.

In a further method step S12, the material WS emptied from the component BT in the emptying pose AP(K)—as explained in conjunction with FIG. 1—is continuously detected by way of the sensor system S. In the process, a movement of the emptied material WS is detected in particular.

In a method step S13 related thereto, a check is carried out as to whether the detected material movement reduces, that is to say becomes significantly weaker or comes to a standstill. As soon as it is determined that there no longer is any significant material movement, a trigger signal TR is generated and transferred to the controller CTL—as described in conjunction with FIG. 1. The trigger signal TR prompts the controller CTL to undertake an emptying check S14 and optionally return to method step S11. If no reduction in the material movement is detected, there is by contrast a return to method step S12.

Within the scope of the emptying check S14, a check is carried out as to whether the component BT has already been emptied. In particular, this check can be carried out by virtue of comparing the weight of the emptied material WS to the weight of the material WS situated in the component BT at the outset. The latter can be ascertained for example on the basis of the volumetric model CAD. If the check yields that the component BT has been emptied, the separation according to embodiments of the invention is successfully terminated and reaches a target state ST.

By contrast, if the test yields that the component BT has not yet been emptied, the counter K is incremented and there is a return to method step S11, within the scope of which the component BT is moved into the next emptying pose AP(K+

1). Optionally, a predetermined time interval can be awaited before the start of the movement into the next emptying pose AP(K) in order to ensure or increase the probability that even possible residual movements of the material WS in the interior of the component BT have stopped.

As already mentioned above, the return to method step S11 is prompted by the trigger signal TR. In this case, the trigger signal TR is considered higher priority than the time progression of the simulated material distribution. In particular, a time duration until the material movement dies down in the emptying pose AP(K), as ascertained by the simulation, is not awaited; instead, the target is the actually measured reduction in the material movement. That is to say, deviating from the simulation-driven control of the movement device BV by the controller CTL, the movement into the next emptying pose AP(K+1) is prompted as soon as no significant material movement occurring anymore is determined by the sensor system S. Inasmuch as the decay time is frequently overestimated by simulations, the emptying process can thus be significantly accelerated as a rule.

As a result of the simulation of the emptying process and the movement of the component into optimized emptying positions based thereon, it is possible as a rule to separate the excess material very effectively from the component. In particular, the movement into the next emptying pose triggered by the higher priority can avoid delays based on an overestimate of the emptying duration on account of simulations. It was found that the emptying duration for the component can be significantly reduced by embodiments of the invention in many cases.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for separating excess material from an additively manufactured component, wherein
   a) spatially resolved structural data relating to the component are received,
   b) on the basis of the spatially resolved structural data a process for emptying material from the component is simulated, wherein a sequence of emptying poses of the component is ascertained, and
   c) for a respective emptying pose:
   the component is moved into the respective emptying pose on the basis of the simulated emptying process,
   a material movement is detected by one or more sensors,
   a trigger signal is generated as a consequence of the detection of a reduction in the material movement, and
   the trigger signal prompts a movement of the component into a subsequent emptying pose, wherein the trigger signal is considered higher priority than the simulated emptying process.

2. The method as claimed in claim 1, wherein on the basis of the spatially resolved structural data a cavity of the component is ascertained and divided into spatial regions, wherein for a respective spatial region a path length of a path running in the cavity to an opening of the cavity and a pouring direction, in which this path length shortens, are ascertained and assigned to the respective spatial region, and wherein the sequence of emptying poses is derived from the ascertained pouring directions.

3. The method as claimed in claim 2, wherein a shortest path length of a respective spatial region to the opening is ascertained by a fast-marching method.

4. The method as claimed in claim 2, wherein the cavity of the component is simulatively filled with virtual material, wherein a spatial region that has a shorter path length to the opening and/or that is filled with more virtual material than other spatial regions is selected, wherein a pouring direction assigned to the selected spatial region is ascertained, and wherein an emptying pose is derived from the ascertained pouring direction.

5. The method as claimed in claim 1, wherein a movement-related distribution of virtual material in the component is simulated within the scope of the simulation of the emptying process.

6. The method as claimed in claim 1, wherein the component is rotated into different spatial orientations and/or made to mechanically vibrate by a movement device.

7. The method as claimed in claim 1, wherein the material movement is detected by a balance which weighs material poured out of the component, and wherein the trigger signal is generated as soon as a weight of the material) poured out remains at least approximately stationary.

8. The method as claimed in claim 1, wherein material falling from the component is detected by an optical sensor, and wherein the trigger signal is generated as soon as a detection result drops below a specified threshold.

9. The method as claimed in claim 8, wherein to detect the material falling from the component, the material is illuminated by a laser.

10. The method as claimed in claim 1, wherein noises of material falling from the component are detected by an acoustic sensor, and wherein the trigger signal is generated as soon as a detection result drops below a specified threshold.

11. The method as claimed in claim 1, wherein movements of the material within the component are detected by a motion sensor, and wherein the trigger signal is generated as soon as a detection event drops below a specified threshold.

12. The method as claimed in claim 1, wherein a specified time interval is awaited following the detection of a reduction in the material movement before the component is moved to the subsequent emptying pose.

13. An assembly for separating a material from an additively manufactured component, configured to carry out the method as claimed in claim 1, comprising a movement device for moving the component into a respective emptying pose and a sensor system for detecting a material movement.

* * * * *